Figure 7:
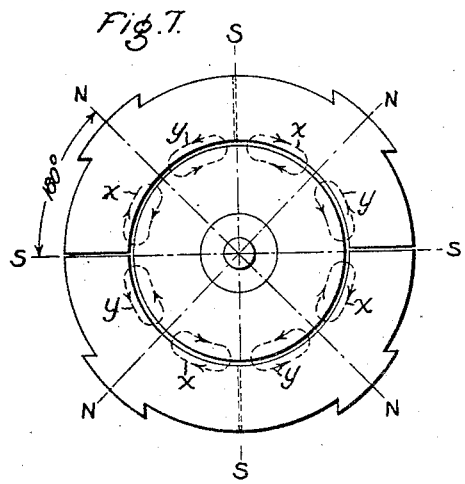
Figure 8:
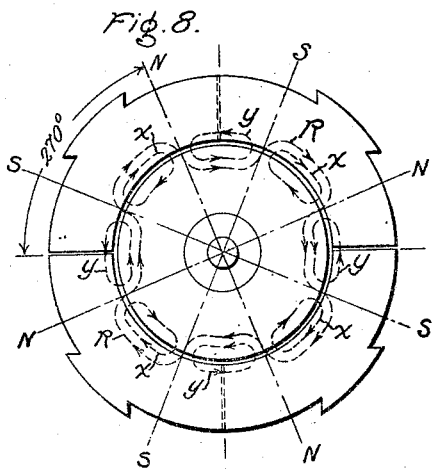

April 20, 1926.                     1,581,876
H. W. SAMSON
DYNAMO ELECTRIC MACHINE
Filed August 12, 1922         2 Sheets-Sheet 1
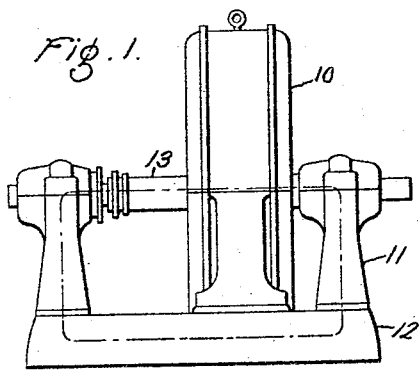
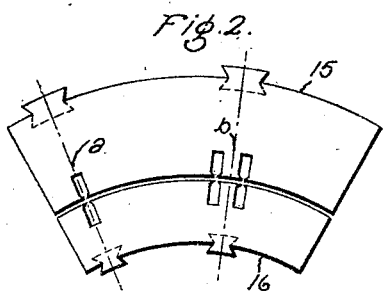
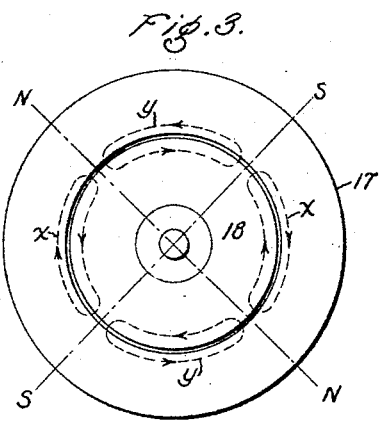
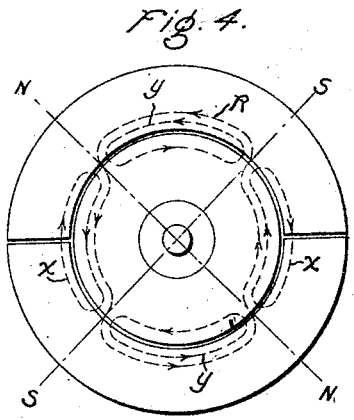
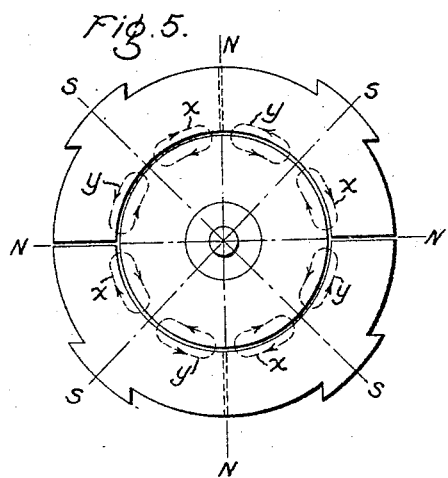
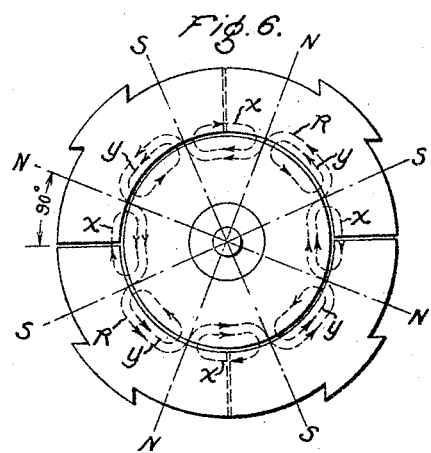
Inventor:
Harry W. Samson,
by [signature]
His Attorney.

April 20, 1926.

H. W. SAMSON 1,581,876

DYNAMO ELECTRIC MACHINE

Filed August 12, 1922    2 Sheets-Sheet 2

Inventor:
Harry W. Samson,
by his Attorney.

Patented Apr. 20, 1926.

1,581,876

UNITED STATES PATENT OFFICE.

HARRY W. SAMSON, OF NISKAYUNA, NEW YORK, ASSIGNOR TO GENERAL ELECTRIC COMPANY, A CORPORATION OF NEW YORK.

DYNAMO-ELECTRIC MACHINE.

Application filed August 12, 1922. Serial No. 581,338.

*To all whom it may concern:*

Be it known that I, HARRY W. SAMSON, a citizen of the United States, residing at Niskayuna, in the county of Schenectady, State of New York, have invented certain new and useful Improvements in Dynamo-Electric Machines, of which the following is a specification.

My invention relates to an improvement in the construction of dynamo-electric machines and especially those having a sectionalized laminated frame or core structure. It also includes a novel method of assembling the sectionalized frame and core structure.

The object of my invention is to improve the frame and core construction of dynamo-electric machines so as to secure a more even distribution of the flux and thus remove the principal cause of shaft currents which are largely due to the unequal distribution of the flux in the magnetic circuits as it flows in the clockwise and counterclockwise paths around the stator and rotor of such machines.

Previous attempts have been made to eliminate the above mentioned shaft current by inserting insulation in the shaft circuit to prevent the current flowing. This method has its disadvantages on some types of machines and especially those having end shield bearings. It is comparatively easy to insert insulation under a pedestal bearing, but it is a more difficult matter when the machine has end shield bearings. In this latter type of machine the remedy has been to insulate the end shield from the frame or the bearing from the bearing housing, either of which are difficult as well as expensive operations. While the above method is most common, other methods have been tried where auxiliary windings have been used to set up counteracting and neutralizing effects. These have been found to be effective to some extent but are objectionable since they require excitation and thus subtract from the efficiency of the machine.

I accomplish the object of my invention by building up the frame and core structure of a dynamo-electric machine with segmental lamination punchings in such a way that the joints between the segments will occur in equal number in the respective flux paths irrespective of the position of the magnetic field. In carrying out my invention in its preferred form I provide punchings having supporting tags arranged unsymmetrically thereon so that they can be assembled to give more than two lap joints per lamination segment.

In dynamo-electric machines and especially in induction motors, synchronous converters, synchronous motors and alternating current generators as well as some types of direct current machines, considerable trouble has been caused by the currents which flow in the shaft as a result of flux cutting the same. This current circulates from the shaft through the bearings to the base of the machine and back to the shaft and in so doing damages the bearings and scores the shaft, thus destroying the bearing surfaces and impairing the efficiency of the machine.

Shaft currents are generally due to the existence of an electromotive force between the shaft and the bearing lining. There are three ways in which such an electromotive force can be produced; first, by alternating flux cutting the shaft; second, by a direct or alternating flux flowing in the shaft; and third, by a difference of potential between the shaft and the ground due to electrostatic effects or the grounding of the rotor conductors to the core. Of these three causes the first is the most common and the one which my invention is primarily designed to overcome.

In dynamo-electric machines, the flux of each north pole after crossing the air gap divides into two portions, one taking a clockwise path and the other a counter-clockwise path to the adjacent south poles. This in effect gives what may be called two different fluxes, a clockwise and a counterclockwise flux. If for any reason the clockwise flux is not equal to the counterclockwise flux a resultant flux equal to the difference between these fluxes will link the shaft and if alternating, will cut the shaft and set up a voltage therein which will cause current to flow.

Since the flux density or flux flow is dependent upon the magnetomotive force and the reluctance of the path through which it flows, it will be seen that any increase of the reluctance in a path will cause a corresponding decrease in the flux which will flow in that particular path. It will also be seen that should a section joint occur in a path that this will increase the reluctance in that path.

As stated before the flux flowing from each of the north poles will divide and flow partly in a clockwise path and partly in a counterclockwise path and if a section joint should occur in one of these paths and not in the other, the reluctance of that path will be increased and consequently the flux flowing in the clockwise path and the counterclockwise path will be unequal. This will cause a resultant flux equal to the difference of flux in the two paths, to shunt around the section joint and link the shaft. This linking flux if alternating in character will cut the shaft upon every alternation and thereby set up a voltage in the shaft which will cause current to flow therein.

Figure 9:
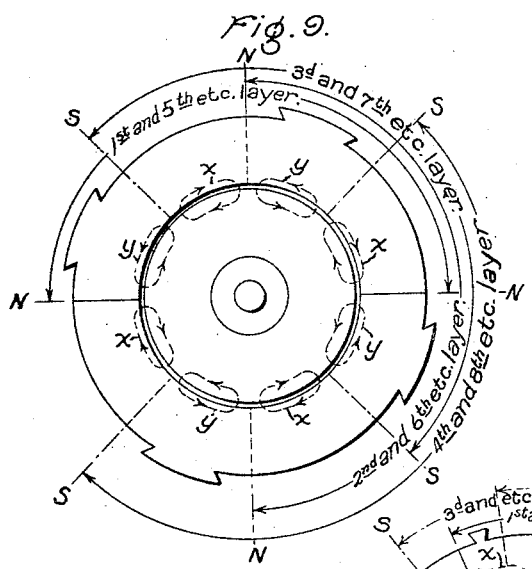
Figure 10:
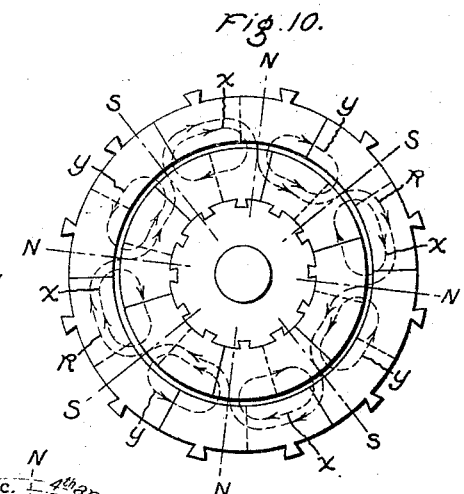
Figure 11:
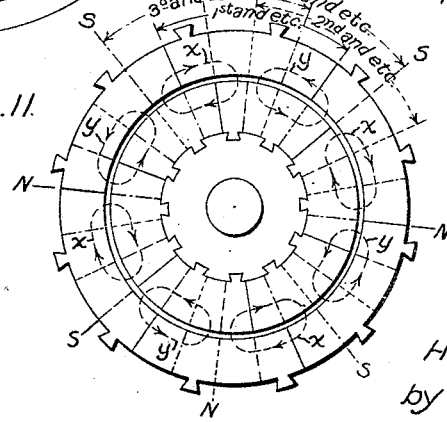

My invention will be better understood from the following description taken in connection with the accompanying drawings in which, Fig. 1 is an elevation of a dynamo-electric machine having outboard bearings and pedestals. The path of the shaft current is indicated thereon by a dot and dash line; Fig. 2 is a view of the individual segments. It shows the manner of locating the dovetail supporting tags or notches thereon; Fig. 3 is a diagrammatic end view of a four-pole dynamo-electric machine having no section joints in either the rotor or stator. The dotted lines thereon indicate the flux paths; Fig. 4 is a similar view of a four-pole dynamo-electric machine having a stator comprised of two sections. The dotted lines thereon indicate the flux paths; Figs. 5, 6, 7 and 8 are diagrammatic axial views of an eight-pole dynamo-electric machine having two symmetrical segments per layer. By two symmetrical segments, I mean segments having their dovetail supporting tags or notches located symmetrically thereon. As shown the electrical field of each succeeding view is advanced 90 electrical degrees with respect to the preceding view. The dotted lines thereon indicate the flux paths in the different positions of the electrical field; Fig. 9 is an axial view of a dynamo-electric machine of the type shown in Figs. 5, 6, 7 and 8 with the exception that the stator is built up of segments having their dovetail supporting tags unsymmetrically arranged upon the segments in a manner similar to that shown in Fig. 2. It shows the positions of the joints in the different layers; Fig. 10 is a view of an eight-pole dynamo-electric machine having a stator and rotor made up of six symmetrical segments per layer, i. e., each segment has symmetrically arranged dovetail supporting tags. The dotted lines indicate the flux paths; Fig. 11 is a view of a dynamo-electric machine similar to that shown in Fig. 10 except that it is built up of segments having unsymmetrically arranged supporting tags as shown in Fig. 2. It shows the position of the joints in the different layers of segments.

Referring to Fig. 1, 10 is a two-piece field frame of a dynamo-electric machine having outboard bearing pedestals 11, and an iron foundation base 12. Journalled in the bearing pedestals 11 is a shaft 13 which carries the armature or rotor of the machine. The dot and dash line indicates the path over which currents induced into the shaft 13 will flow in a machine of this type.

Referring to Fig. 2, I show here punchings for a laminated field and rotor structure such as I propose to use as the preferred modification of my invention. 15 is a punching for the frame or stator of a dynamo-electric machine and 16 is a punching for the rotor of such a machine. As shown, the dovetail supporting tags or slots (the latter shown with dotted lines) are located unsymmetrically upon the punchings and preferably approximately at the ⅛th and ⅝th points from one end of the punching. It should also be noted that the dovetail tags or slots are located symmetrically with respect to the conductor slots, i. e., either on the same center line with the slot, as shown at "a" or on a line passing midway between the two conductor slots, as shown at "b". This arrangement of conductor slots and dovetail supporting tags or slots is necessary to make it possible to turn the segments over and have the dovetail supporting tags or slots and conductor slots coincide. With segments of this type it is possible to assemble a magnetic field structure which will have more than two joints per lamination segment, and at the same time secure a greater cross-section of iron adjacent each joint than has heretofore been obtained for the reason that at each joint only every fourth layer of segments will be broken and as a result the iron cross-section adjacent each joint will be ¾ of the total frame cross-section. This increase in cross section will reduce the total reluctance of the magnetic structure and thereby reduce the core loss of the machine and thus improve its efficiency. It is not important that the dovetail supporting tags or notches come exactly at the ⅛th and ⅝th points on the segment, but it is essential that each tag or notch comes opposite a conductor slot or a tooth, so that the conductor slots in the turned over segments will coincide with those in the other segments.

Referring to Fig. 3, I show in this figure a diagrammatic axial view of a four-pole dynamo-electric machine having a solid stator 17 and a rotor 18. The rotor 18 for purposes of clearness will not be considered at this time. The dotted lines and arrows $x$ and $y$ indicate the clockwise and counterclockwise fluxes of the stator respectively.

As indicated the total flux from the north poles will divide and flow through the rotor and air gaps to each south pole and back through the stator to the north pole again, making two loops of flux, one flowing in a clockwise and the other in a counterclockwise direction.

Assuming that the air gaps and the magnetic structure are uniform and that no section joint occurs in any one of the flux paths it will be seen that the fluxes in each direction will be equal and as a result no flux will link or cut the shaft.

Referring to Fig. 4, I show a view similar to that shown in Fig. 3 except that the stator is composed of two parts. The section joint between the parts for purpose of clearness is shown as falling midway between the north and south poles. In this figure the reluctances of the flux paths are not all equal because of the increase in reluctance caused by the joints which occur in only two of the four path. As indicated the joints both occur in the paths of the clockwise flux $x$ and as a result a portion of the flux $x$ will seek a path of less reluctance and flow in a counterclockwise direction as indicated by the dotted line and arrows R. This resultant flux R will alternate every time the field moves through an arc equal to one pole pitch. It is this linking and cutting of the shaft by the alternating flux R which my invention is designed to eliminate.

Referring to Figs. 5, 6, 7 and 8, I show here diagrammatic views of an eight-pole dynamo-electric machine of the induction motor type having a stator made up of lamination segments which are lapped as is standard practice so that in effect there are four points in the stator frame where the reluctance of the magnetic circuit is increased because of the joints made between the alternate layers of segments. In Fig. 5, I show the electromagnetic north poles as centered over the joints of the stator and in Figs. 6, 7 and 8, I show the magnetic fields of each succeeding figure as shifted with respect to each preceding figure, 90 electrical degrees or one-half a pole pitch in the clockwise direction.

With the magnetic field in the position shown in Fig. 5 the fluxes $x$ and $y$ flowing in the stator will be equal and no resultant flux R will link the shaft of the machine, but when the magnetic field is shifted to the position shown in Fig. 6, or 90 electrical degrees from the previous position, the flux $x$ will flow across the segment joints and as a result a portion of this flux will take a path of lesser reluctance and link the shaft as indicated by the dotted line and arrows R. The flux $y$ will remain constant as no segment joints occur in its path. This position of the field gives a counterclockwise resultant flux R linking the shaft and by shifting the magnetic field to the position shown in Fig. 7, or 180 electrical degrees from its original position, it will be seen that the fluxes $x$ and $y$ are again equal and no flux will link the shaft. A still further shift of the magnetic field to the position shown in Fig. 8 or 270 electrical degrees from its original position will show that the segment joints now occur in the path of the flux $y$ and as a result a portion of this flux will flow around the frame and rotor as indicated by dotted line and arrows R. The resultant flux R in this position of the field will flow in a clockwise direction.

From the above, assuming a negligible slip, it will be seen that this resultant flux R will alternate four times for every revolution of the field and therefore the frequency of the current which will be induced into the shaft will be equal to line frequency. By line frequency I mean the frequency of the power line from which the machine is driven.

Referring now to Fig. 9, I show here a stator which is made up of laminated segments in accordance with my invention. By referring to this figure of the drawing it will be seen that I obtain four or twice as many joints per lamination segment as in the field structure shown in Figs. 5, 6, 7 and 8 which are made up in accordance with present practice. It will also be seen that the segments are of the same size and that no greater number are required to secure these additional joints. In addition to securing a greater number of joints with the same number of segments I am also able to get this result without increasing the number of supports.

Assuming now that the electromagnetic field is shifted about this stator as was illustrated in Figs. 5, 6, 7 and 8 it will be seen that the fluxes $x$ and $y$ will always be equal because they will always be acted upon equally by the segment joints, i. e., they will either be free from the reluctance of the joints or both traverse the same number of joints at the same time. While the above result is the object of my invention it will also be seen that I obtain a more uniform distribution of the total flux of the machine owing to the fact that instead of one-half the total iron cross-section at each joint I obtain a cross-section of iron equal to three-fourths of the total frame cross-section and since the magnetic paths only extend from pole to pole it will be seen that the cross-sectional area of the flux path in this type of construction will only vary from three-fourths of the total area to the total area as distinguished from those of the present type where the cross-section of iron at the joints varies from one-half the total area to the total area.

Referring to Fig. 10, I show a diagrammatic end view of a large eight-pole induction motor having its stator and rotor made up of six symmetrical lamination segments per layer. Consider first the stator alone; the magnetic field is here shown in a position where the clockwise flux predominates in the stator yoke and as a result the flux R will link the shaft and flow in a clockwise direction. This is due to the fact that the reluctance of the eight joints in series in the low flux density region is less than that of the reluctance of the four joints in series in the high flux density regions. Assume now that the magnetic field is shifted $\frac{1}{24}$th of a revolution or 60 electrical degrees. According to the above it will then be seen that a counterclockwise flux will predominate in the stator yoke and a still further shift of the magnetic field to $\frac{1}{12}$th of a revolution or 120 electrical degrees from its original position will give a predominance of clockwise flux in the stator yoke or, in other words, we have the same conditions as existed in the first position as shown in Fig. 10. Thus the stator joints give a flux linking the shaft which completes twelve cycles for every revolution of the field. In other words, the frequency of this flux R is 180 cycles per second or three times the line frequency.

Consider now the rotor alone. It will be seen, assuming no slip, that the joints will always remain in the same positions with respect to the magnetic field and therefore a clockwise flux will prevail at all times in the rotor as shown in the drawing. We will, however, have to consider the slip as it always exists in this type of motor and since it is evident that the effect of the rotor joints are not dependent upon the stator joints it will be seen that at a later moment of slip frequency cycle the rotor joints will give a predominance of counterclockwise flux, and after $\frac{1}{12}$th of a revolution of the flux with respect to the rotor the clockwise flux will again reach a maximum and a cycle of shaft voltage variation due to the rotor segment will be completed.

Consider now the stator and rotor together. In the first position we get a net resultant clockwise flux, in the second position a zero flux and in the third position we again get a clockwise flux; and one-third of a slip cycle later, the three positions will give counterclockwise flux in the first position, zero flux in the second position and a counter clockwise flux again in the third position. Therefore, the 180 cycle or three times line frequency shaft current due to the stator segments is simply superposed on the 180 $x$ per cent slip cycle current due to the rotor segments. The magnitudes of each of the two currents are the same as if they existed independently and the current flowing in the shaft will be equal to their geometrical sum.

Referring now to Fig. 11, I show the stator and rotor of an eight-pole induction motor similar to that shown in Fig. 10, made up of lamination segments in accordance with my invention. It will be seen that I obtain four joints per segment in both the stator and rotor and that for any position of the magnetic field the same number of joints will occur in each flux path and therefore no unbalancing of the fluxes will exist to induce a voltage in the shaft.

The general law which enables a prediction to be made as to whether or not any given sectionalizing of the stator will cause shaft currents with any given number of poles is as follows: Sectionalizing the stator will cause shaft currents if the ratio of twice the number of joints to the number of poles, expressed as a fraction reduced to its lowest terms, has an odd number for its numerator. The frequency of the shaft currents will be equal to this numerator times line frequency. If the numerator is an even number, no shaft currents will appear as a result of the joints. For example, with four joints and fourteen poles the ratio reduces to four-sevenths and, as four is an even number, there are no shaft currents. With two joints and eight poles the ratio reduces to one-half and a line frequency current will be set up in the shaft.

The above rule applies only in cases where all joints are equally spaced.

Restating the rule given above; the use of symmetrical segmental punchings will cause shaft current if four times the segments over the poles, expressed as a fraction reduced to its lowest terms, has an odd number for its numerator. The frequency of the shaft current will be equal to this numerator times line frequency. For example, with two segments and eight poles as shown in Figs. 5, 6, 7 and 8, the ratio reduced to one and a line frequency current will be set up in the shaft. With an eight-pole, six segment motor as shown in Fig. 10 the ratio will reduce to three and the frequency of the resulting shaft current will be three times line frequency.

The above rule applies only where the segments are of equal length and have their supporting tags located symmetrically thereon as is the usual practice.

When the segments are laid out unsymmetrically as shown in Figs. 2, 9 and 11 with the dovetail supporting tags or notches placed approximately at the $\frac{1}{8}$th and $\frac{5}{8}$th points instead of symmetrically or at the $\frac{1}{4}$th and $\frac{3}{4}$th points as shown in Figs. 5, 6, 7, 8 and 10 as is usually the case, the core can be built up with four joints per segment instead of two. This, as has been stated before, will give at each joint three-fourths of the total iron instead of one-half of the total iron.

In assembling the segments in accordance with my invention I prefer to lay the first two layers so that they will lap half-way on each other in the usual way and in laying the third and fourth layers I turn them upside down and lap them the same way so that the new joints will come midway between the first joints. This will give a staggered arrangement of the four joints per segment.

While I prefer this arrangement of the layers, it should be understood that the object of my invention can be accomplished by other arrangements when a portion of the total number of segments are turned upside down with respect to the remaining portion of the segments in such a way that the joints of one portion of the segments fall midway between the joints formed by the other portion of the segments.

What I claim as new and desire to secure by Letters Patent of the United States, is:

1. In a dynamo-electric machine having a laminated member, segments having supporting means located unsymmetrically thereon and assembled to give an iron cross-section across the joints between said segments of more than one-half the total cross-section of said laminated member, said joints being equally spaced around the said laminated member.

2. In a dynamo-electric machine having a laminated magnetic member, lamination segments having unsymmetrically arranged supporting means, said supporting means being arranged with respect to the conductor slots and assembled so that the segments give four joints in the said magnetic member within the confines of each of said segments, said joints being equally spaced about said magnetic member.

3. A lamination segment for dynamo-electric machines having securing means adapted to engage supporting means and conductor slots so arranged that the segments can be reversed and located in four different equi-distant positions with respect to said supporting means.

4. A method of assembling segmental laminated parts of dynamo-electric machines which consists in staggering the segments when laid one side up, then reversing the segments and staggering the reversed segments in such a way that the second set of joints fall half-way between the joints formed by the first set of segments.

5. In a dynamo-electric machine having a segmental laminated member, electro-magnetic poles adjacent said laminated member, segments in said laminated member having supporting means located unsymmetrically thereon and arranged to give an iron cross section across joints between said segments of more than one-half the total cross section of said laminated member, said joints being arranged to fall in equal number in each of the magnetic paths between adjacent magnetic poles irrespective of the position of said magnetic poles.

In witness whereof I have hereunto set my hand this 10th day of August 1922.

HARRY W. SAMSON.